US012617065B1

(12) United States Patent
Chen

(10) Patent No.: US 12,617,065 B1
(45) Date of Patent: May 5, 2026

(54) MULTIFUNCTIONAL ELECTRIC TOOL WITH THE FUNCTION OF EASY HEAD REPLACEMENT

(71) Applicant: Donghua Chen, Jiangsu (CN)

(72) Inventor: Donghua Chen, Jiangsu (CN)

( * ) Notice: Subject to any disclaimer, the term of this patent is extended or adjusted under 35 U.S.C. 154(b) by 0 days.

(21) Appl. No.: 19/069,713

(22) Filed: Mar. 4, 2025

(51) Int. Cl.
*B25F 3/00* (2006.01)
*B25F 5/02* (2006.01)

(52) U.S. Cl.
CPC . *B25F 3/00* (2013.01); *B25F 5/02* (2013.01)

(58) Field of Classification Search
CPC ..................................... B25F 3/00; B25F 5/02
See application file for complete search history.

(56) References Cited

U.S. PATENT DOCUMENTS 3,724,237 A * 4/1973 Wood .................... B23B 45/003 403/348
3,952,239 A * 4/1976 Owings ..................... B25F 5/02 173/171
5,033,552 A * 7/1991 Hu .......................... B25B 21/00 241/37.5
5,170,851 A * 12/1992 Kress ...................... H01H 9/063 310/47
D420,267 S * 2/2000 Robson ............................ D8/61
6,153,838 A * 11/2000 Wadge ..................... H01H 3/20 200/50.01
6,263,980 B1 * 7/2001 Wadge ...................... B25F 3/00 173/171
6,553,642 B2 * 4/2003 Driessen ................... B25F 3/00 173/217
6,634,439 B2 * 10/2003 Driessen ................... B25F 3/00 173/171
6,641,467 B1 * 11/2003 Robson .................. B23D 51/10 408/31
6,675,911 B2 * 1/2004 Driessen ................... B25F 3/00 173/171
7,077,736 B2 * 7/2006 Uzumcu ............. B23D 47/126 451/358
7,596,872 B2 * 10/2009 Clarke ................. B25H 1/0078 30/388
D626,395 S * 11/2010 Lau .................................. D8/71
D626,398 S * 11/2010 Lau ................................ D8/107
9,751,176 B2 * 9/2017 McRoberts ............... B25F 5/02
9,821,430 B2 * 11/2017 Zhang ..................... B24B 23/04
9,956,676 B2 * 5/2018 Wong ...................... B24B 23/04
9,956,677 B2 * 5/2018 Baskar ...................... B25F 3/00
11,351,667 B2 * 6/2022 Junkersdorf ............ B25F 5/001
11,772,246 B2 * 10/2023 Czirjak ..................... B25F 5/02 81/52

(Continued)

FOREIGN PATENT DOCUMENTS

CN 111673145 A * 9/2020 ................ B25F 5/00
CN 112318441 A * 2/2021 ................ B25F 1/00
WO WO-2023029266 A1 * 3/2023 ................ B25F 1/02

*Primary Examiner* — Lucas E. A. Palmer

(57) ABSTRACT

The present application relates to the technical field of electric tools, and specifically discloses a multifunctional electric tool with the function of easy head replacement, comprising at least one tool head, characterized in that it also includes a control mechanism, a power mechanism, an upper connecting head, a quick-connect and quick-disconnect mechanism and a shell, which can realize quick disassembly and quick installation, realize quick replacement of the tool head, and is more convenient to use.

8 Claims, 17 Drawing Sheets

(56) References Cited

U.S. PATENT DOCUMENTS

| | | | | | |
|---|---|---|---|---|---|
| 2009/0272554 | A1* | 11/2009 | Young | F01D 15/06 | 173/169 |
| 2011/0266014 | A1* | 11/2011 | McRoberts | B25F 5/02 | 173/170 |
| 2011/0272172 | A1* | 11/2011 | Lau | B25F 3/00 | 173/170 |
| 2013/0008677 | A1* | 1/2013 | Huifu | B25D 1/00 | 29/401.1 |
| 2015/0135541 | A1* | 5/2015 | Wierzchon | B25F 5/006 | 279/144 |

* cited by examiner

MULTIFUNCTIONAL ELECTRIC TOOL WITH THE FUNCTION OF EASY HEAD REPLACEMENT

FIELD OF THE APPLICATION

The present application relates to the technical field of electric tools, and in particular to a multifunctional electric tool with the function of easy head replacement.

BACKGROUND

With the advancement of industrial technology, the variety of power tools available today is increasing, and their applications are becoming increasingly diverse. Typically, these power tools consist of a drive motor, a transmission device connected to the motor, and a tool head that is driven by the transmission device. Different types of tool heads serve various functions. For example, a saber saw cuts through materials using the reciprocating motion of a saw blade, an electric saw cuts wood by means of a rotating chain, and an electric drill is used for drilling holes. In the past, power tools for each specific function came with a complete set of tool heads, which not only wasted materials but also occupied a lot of space and made storage inconvenient.

The patent with application number CN201811349487.9 in the prior art describes a multifunctional electric tool featuring a quick-change connector. This tool consists of a body and at least one tool head. The body is connected to the tool head through a quick-release connector assembly. Inside the body, there is at least one motor, which is linked to at least one output shaft. The end of the output shaft connects to the quick-change connector assembly. This assembly includes a connecting shaft that is detachably connected to the output shaft. Correspondingly, the tool head has a matching connecting hole designed for the connecting shaft. Additionally, the assembly features a fixed connector that is securely attached to the body, located around the perimeter of the connecting shaft. It also includes a movable connector: one end of this connector attaches to the tool head, while the other end connects detachably and securely to the fixed connector. Once the tool head is connected to the connecting hole, it is subsequently affixed to the fixed connector through the movable connector.

Although this technology allows for the tool head to be connected via a movable connector, making disassembly and replacement easier, the connection method is relatively complex. Consequently, the process of connecting and replacing the tool head can be cumbersome, and achieving one-button disassembly and assembly is not possible.

To address these issues, a multifunctional electric tool that facilitates easy head replacement has been designed.

SUMMARY

The technical problem to be solved by the present application is to overcome the defects of the above-mentioned technology and provide a multifunctional electric tool that is easy to replace the head.

In order to solve the above technical problems, the technical solution provided by the present application is a multifunctional electric tool with an easy-to-replace head, comprising at least one tool head, a control mechanism, a power mechanism, an upper connecting head, a quick-connect and a quick-disconnect mechanism and a shell. The tool head is mounted on the upper connecting head in a detachable manner, a limit plate is provided on the outer wall of the lower end of the upper connecting head, and a connecting groove is symmetrically provided on the inner wall of the lower end of the upper connecting head. The quick-connect and quick-release mechanism is arranged on the upper inner part of the shell, and the front and rear ends of the inner wall of the upper end of the shell are provided with inclined guide plates, and the guide plates at the front and rear ends of the shell are symmetrical about the midpoint of the shell end. Guide grooves are provided on both sides of the lower end of the tool head, and the tool head slides with the corresponding guide plates through the guide grooves, and the upper connecting head is connected and matched with the connecting groove, the limit plate and the quick-connect and quick-release mechanism to achieve quick release and quick connection. The power mechanism is arranged in the shell, and the control mechanism is arranged in the shell.

The quick-connect and quick-release mechanism includes a limit adjustment ring, an external connecting tube and a spring, an unlocking button is provided on the outer side of one end of the limit adjustment ring, a first hole is provided on the outer shell at a position corresponding to the unlocking button, the unlocking button extends from the first hole, a spring connecting part is provided on the outer side of the other end of the limit adjustment ring, the spring is sleeved on the spring connecting part, and the other end of the spring is against the inner wall of the outer shell, a limit part is provided on the inner side of one end of the limit adjustment ring provided with the spring connecting part, the limit part cooperates with the limit plate to limit and fix the upper connecting head, arc-shaped protrusions are symmetrically provided on the external connecting tube, the external connecting tube is arranged in the limit adjustment ring, the lower end of the upper connecting head is sleeved on the external connecting tube, and the arc-shaped protrusion cooperates with the connecting groove.

The lower end of the outer connecting tube is symmetrically provided with a connecting plug board, and the inner wall of the outer shell is symmetrically provided with a installation groove. The outer connecting tube is installed in the outer shell through the cooperation of the connecting plug board and the installation groove.

As an improvement, the power mechanism includes a battery, a motor, and an internal connecting tube, the battery is arranged in the lower part of the outer shell, the motor is arranged in the outer shell and is located above the battery, a plurality of limiting edges are evenly arranged on the outer periphery of the lower end of the internal connecting tube, a connecting hole is arranged at the lower end of the outer connecting tube, a plurality of limiting grooves are evenly arranged on the inner wall of the connecting hole, the internal connecting tube is arranged in the connecting hole, and the limiting edges and the corresponding limiting grooves are connected and matched, the rotating shaft of the motor extends from the internal connecting tube to the outer connecting tube, and the lower end of the outer connecting tube abuts against the motor.

As an improvement, the internal connecting tube is provided with a connector that matches it, and the upper end of the connector extends into the tool head to drive the tool head to operate.

As an improvement, the upper end of the upper connecting head is provided with a positioning sleeve, and the upper end of the upper connecting head is symmetrically provided with a card slot, and the positioning sleeve is symmetrically provided with a card board, and the card board and the card slot cooperate to position the positioning sleeve, and the upper end of the connector passes through the positioning sleeve and is rotatably connected to the positioning sleeve.

As an improvement, the control mechanism includes a control panel, a power switch, and an adjustment button. The control panel is arranged in the shell, the power switch is welded on the control panel, the adjustment button is welded on the control panel, a second hole is placed on the shell at a position corresponding to the power switch, the power switch extends from the second hole, a notch is arranged on the shell at a position corresponding to the adjustment button, and the adjustment button extends from the notch.

As an improvement, a charging socket is arranged at the lower end of the control panel, the charging socket extends from the lower end of the shell, a lamp is arranged at the lower end of the shell, a light switch is arranged on the control panel, a third hole is arranged on the shell at a position corresponding to the light switch, and the light switch extends from the third hole.

As an improvement, a slot is symmetrically arranged at the upper end of the upper connecting head, the tool head can be connected to the upper connecting head through the slot and fixed by bolts.

As an improvement, a positioning block is symmetrically arranged at the lower end of the upper connecting head, a positioning groove is symmetrically arranged on the inner wall of the limit adjustment ring, and the positioning block and the positioning groove cooperate.

The advantages of the present application compared with the prior art are:

1. The quick-connect and quick-release mechanism includes a limit adjustment ring, an external connection tube, and a spring. The upper connection head is pressed and inserted into the quick-connect and quick-release mechanism in the shell, to realize the quick connection of the tool head. Specifically, the arc-shaped protrusion cooperates with the connection groove to realize the connection with the external connection tube. At the same time, the upper connection head will be limited to prevent the upper connection head from shaking. The limit adjustment ring is provided with a limit part on the inner side of one end of the spring connection part. The limit part will be placed above the limit plate to limit and fix the upper connection head. Moreover, the spring will give a force to the limit adjustment ring, so that the end of the limit part will be close to the outer wall of the connection head, further enhancing the stability of the connection. When replacing, press the unlocking button to push the limit adjustment ring to move to one side of the spring and compress the spring, so that the limit part will be misaligned with the limit plate and will not be located directly above the limit plate, which will release the limit on the limit plate. In this way, the tool head can be directly pulled out upwards to realize one-key disassembly and assembly, which is more convenient and quicker to replace.

2. The front and rear ends of the inner wall of the upper end of the shell are both provided with inclined guide plates, which are symmetrical about the midpoint of the shell end. Both sides of the lower end of the tool head are provided with guide grooves, and the tool head slides with the corresponding guide plates through the guide grooves. In this way, when installing the tool head, on the one hand, it can guide, and on the other hand, the inclined guide plates, and the front and rear end guide plates are symmetrical about the midpoint of the shell end, so that when installing the tool head, the tool head can be screwed into the shell, making the connection more compact and stable.

3. The control mechanism can be used to adjust different modes according to different tool heads. A light is provided at the bottom of the shell, which is convenient for lighting in dimly lit places and is more convenient to use.

As show in FIGS. 1-17

Figure 1:
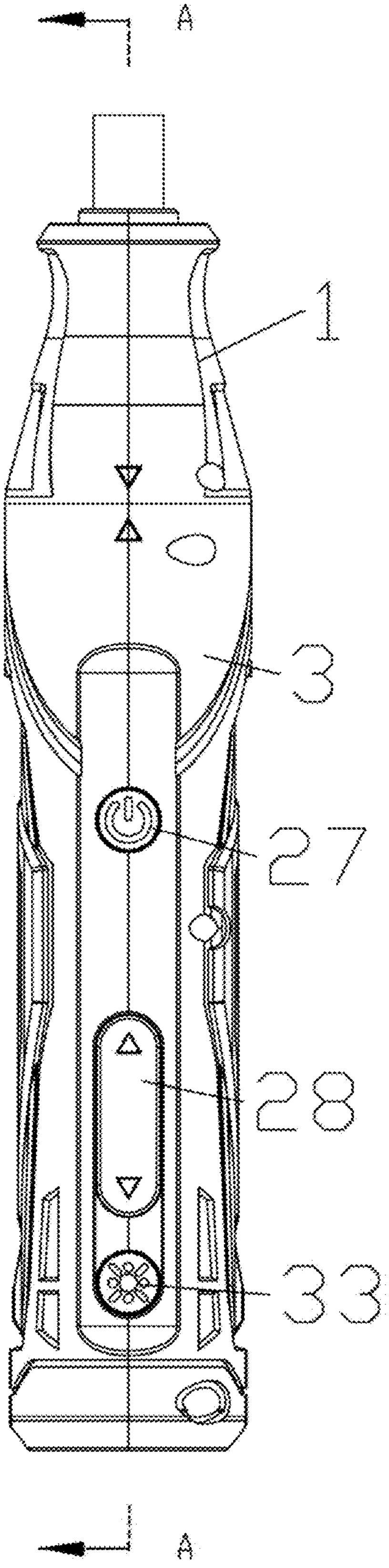
FIG. 1 is a front view of a multifunctional electric tool embodiment 1 for easy replacement of the head of the present invention.
Figure 2:
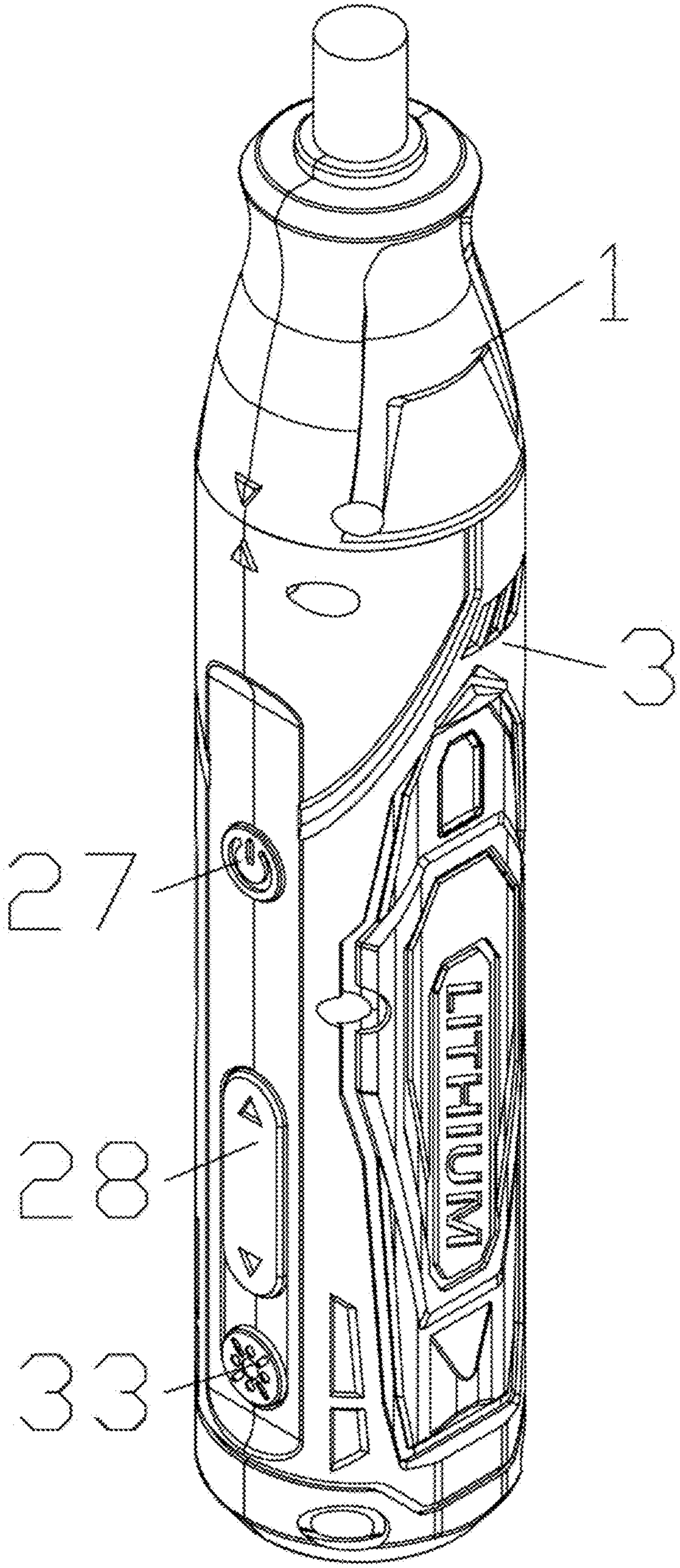
FIG. 2 is a top view of a stereoscopic structure of a multifunctional electric tool embodiment 1 for easy replacement of the head of the present invention, thereof.
Figure 3:
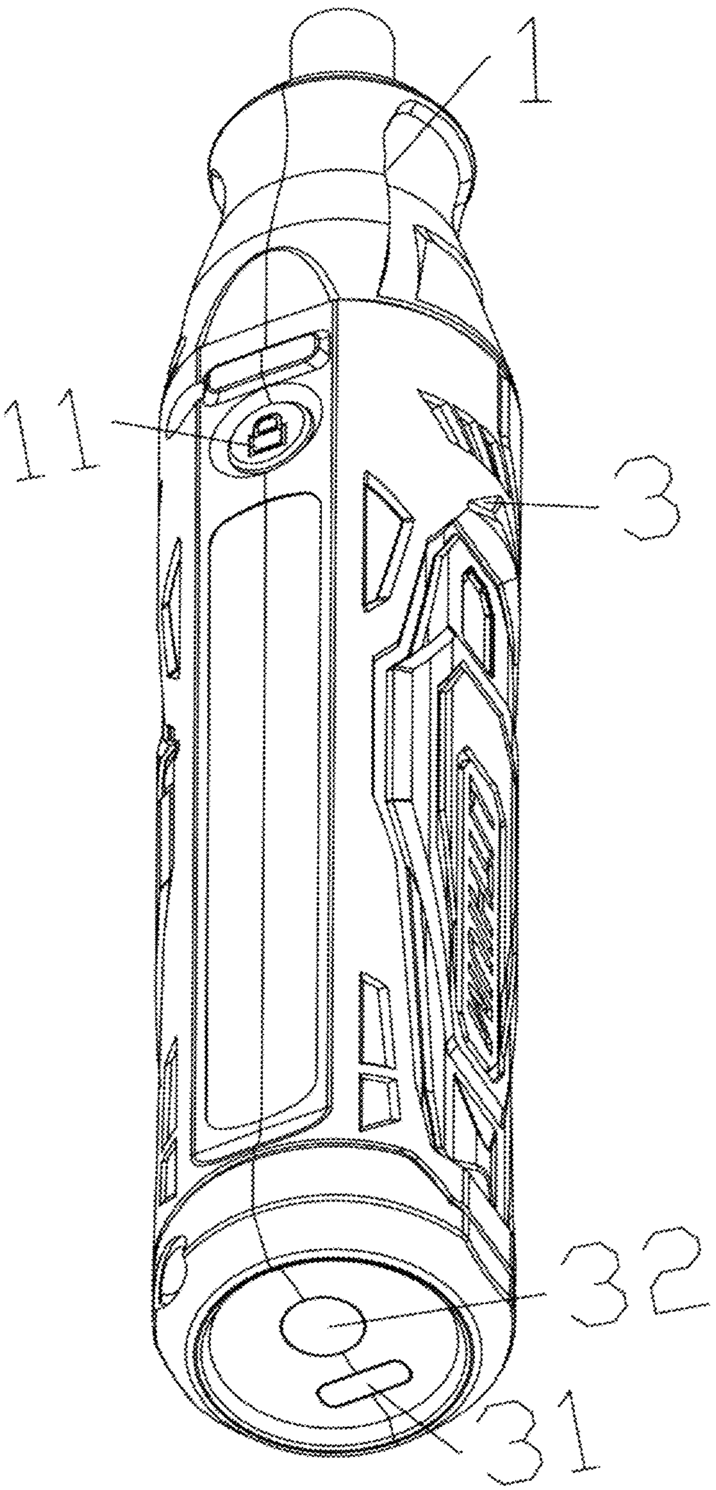
FIG. 3 is a bottom view of a stereoscopic structure of a multifunctional electric tool embodiment 1 for easy replacement of the head of the present invention, thereof.
Figure 4:
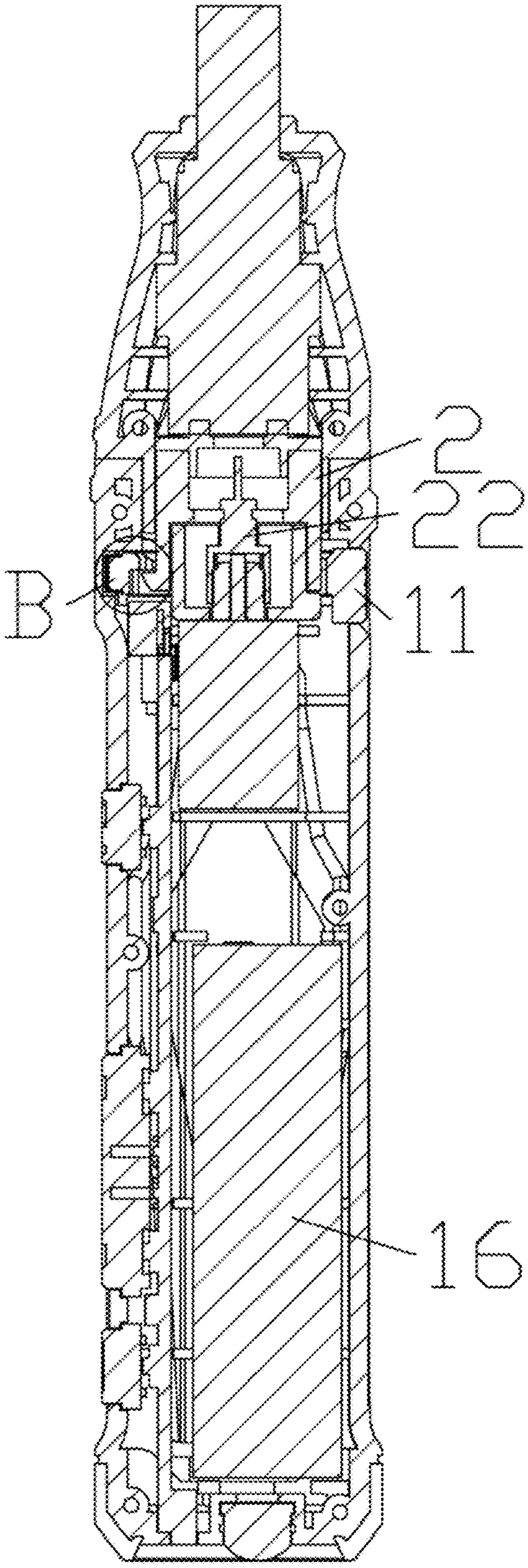
FIG. 4 is a cross-sectional view at A-A in FIG. 1, thereof.
Figure 5:
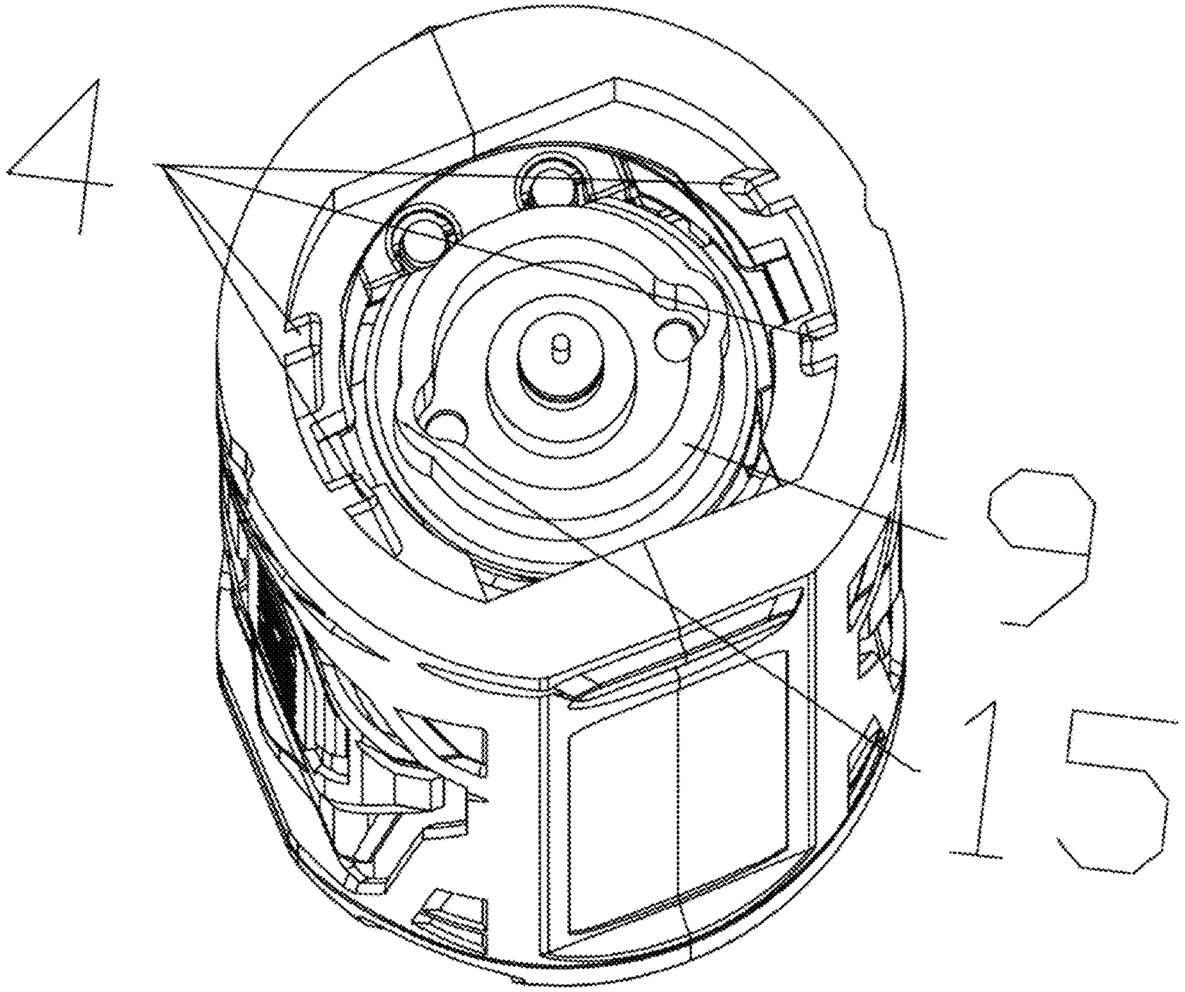
FIG. 5 is a disassembled state diagram 1 of a multifunctional electric tool with the function of easy head replacement of the present invention, thereof.
Figure 6:
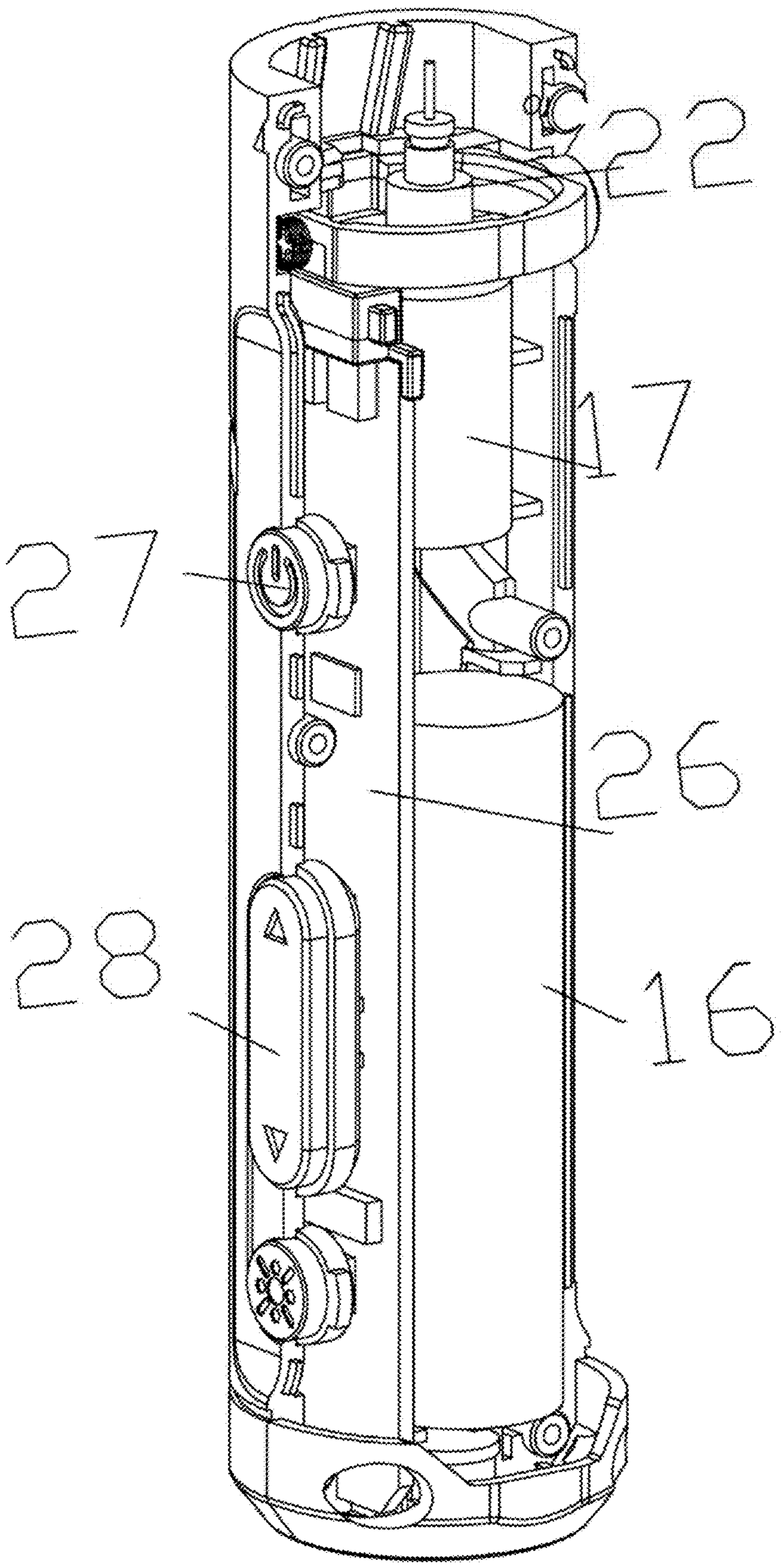
FIG. 6 is a reference diagram of the internal state of a multifunctional electric tool with the function of easy head replacement of the present invention, thereof.
Figure 7:
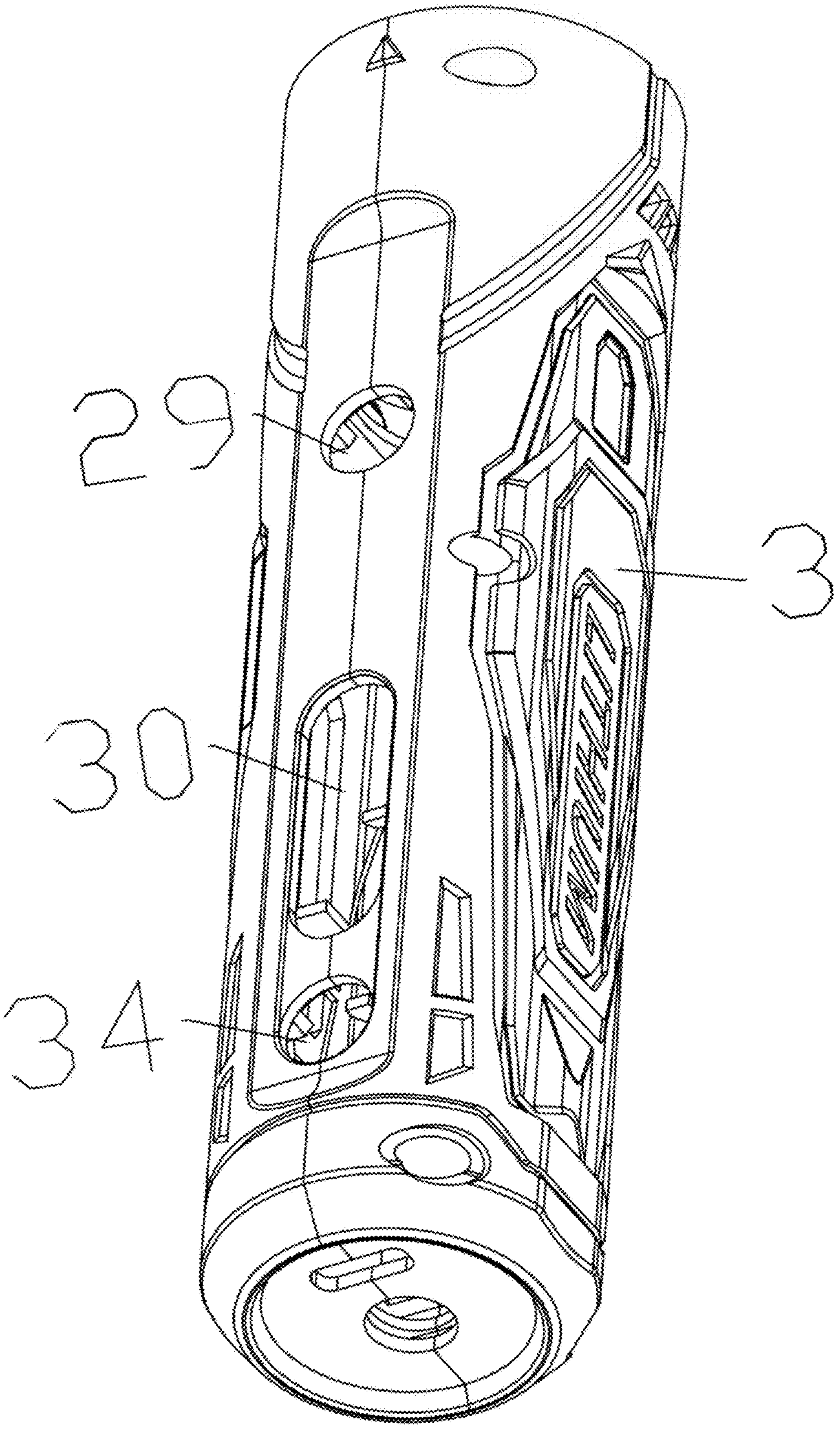
FIG. 7 is a structural schematic diagram of the housing of a multifunctional electric tool in with the function of easy head replacement of the present invention, thereof.
Figure 8:
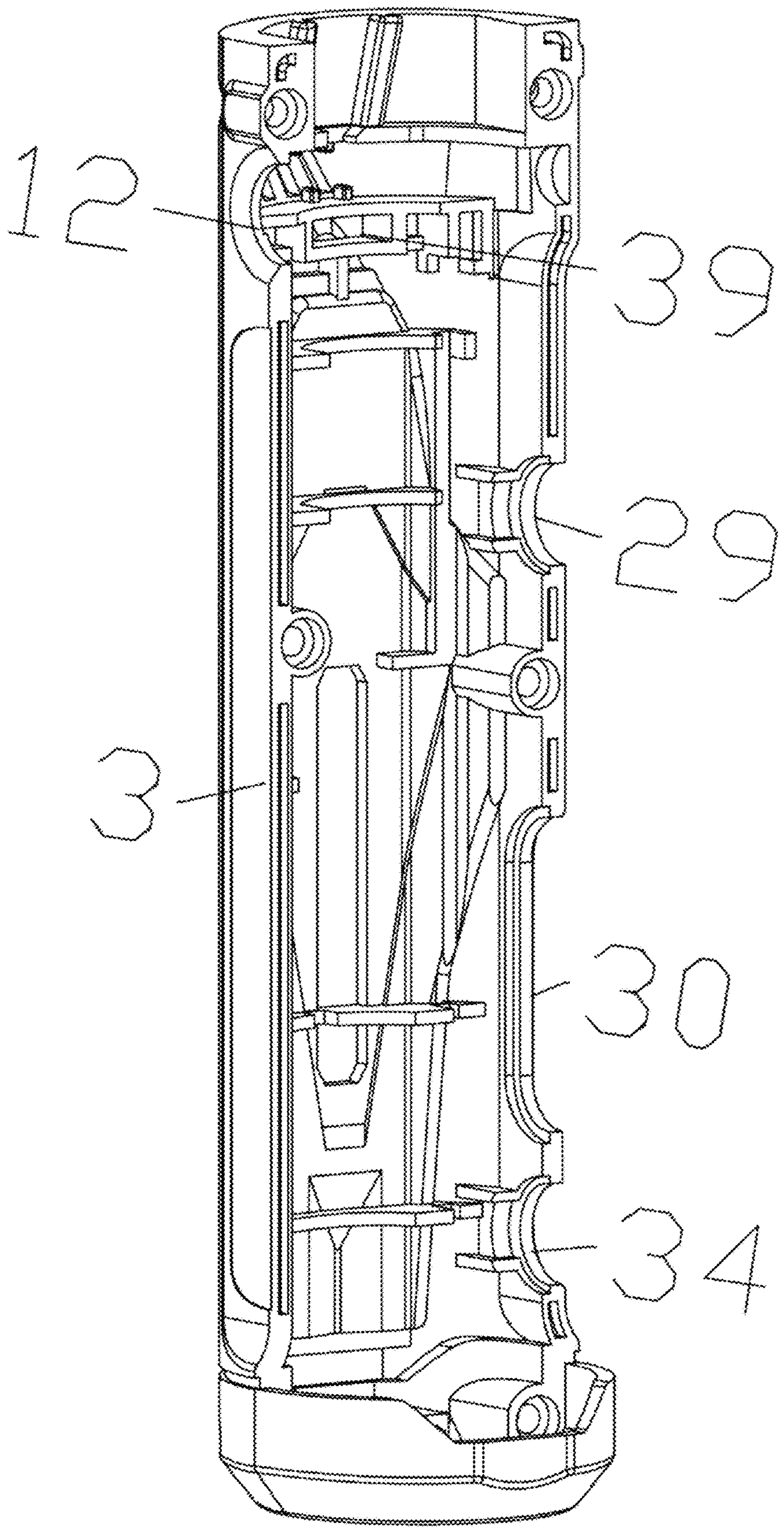
FIG. 8 is a structural schematic diagram of the housing of a multifunctional electric tool with the function of easy head replacement of the present invention in a disassembled state, thereof.
Figure 9:
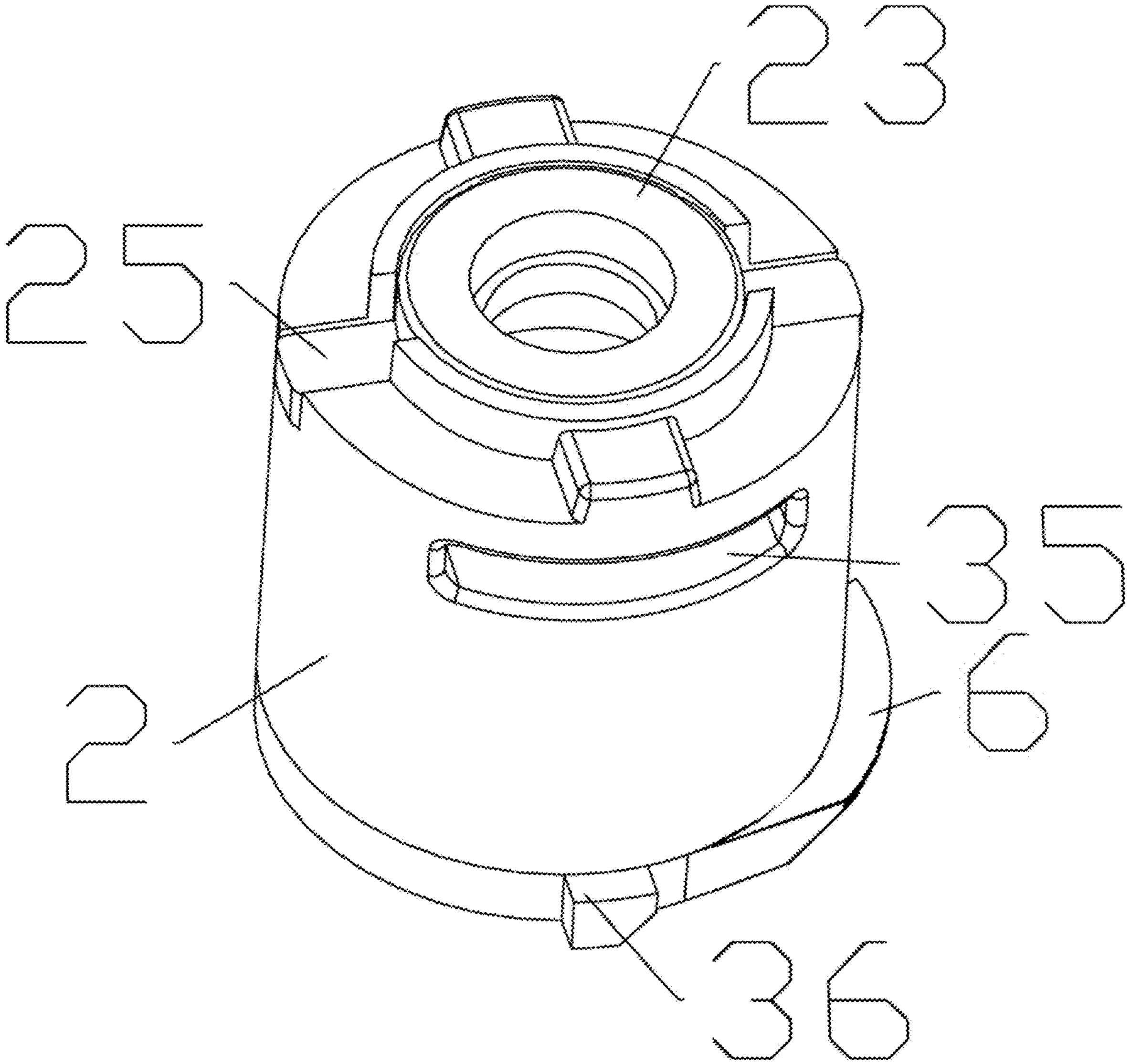
FIG. 9 is a structural schematic diagram of the upper connector and the positioning sleeve of a multifunctional electric tool with the function of easy head replacement of the present invention, thereof.
Figure 10:
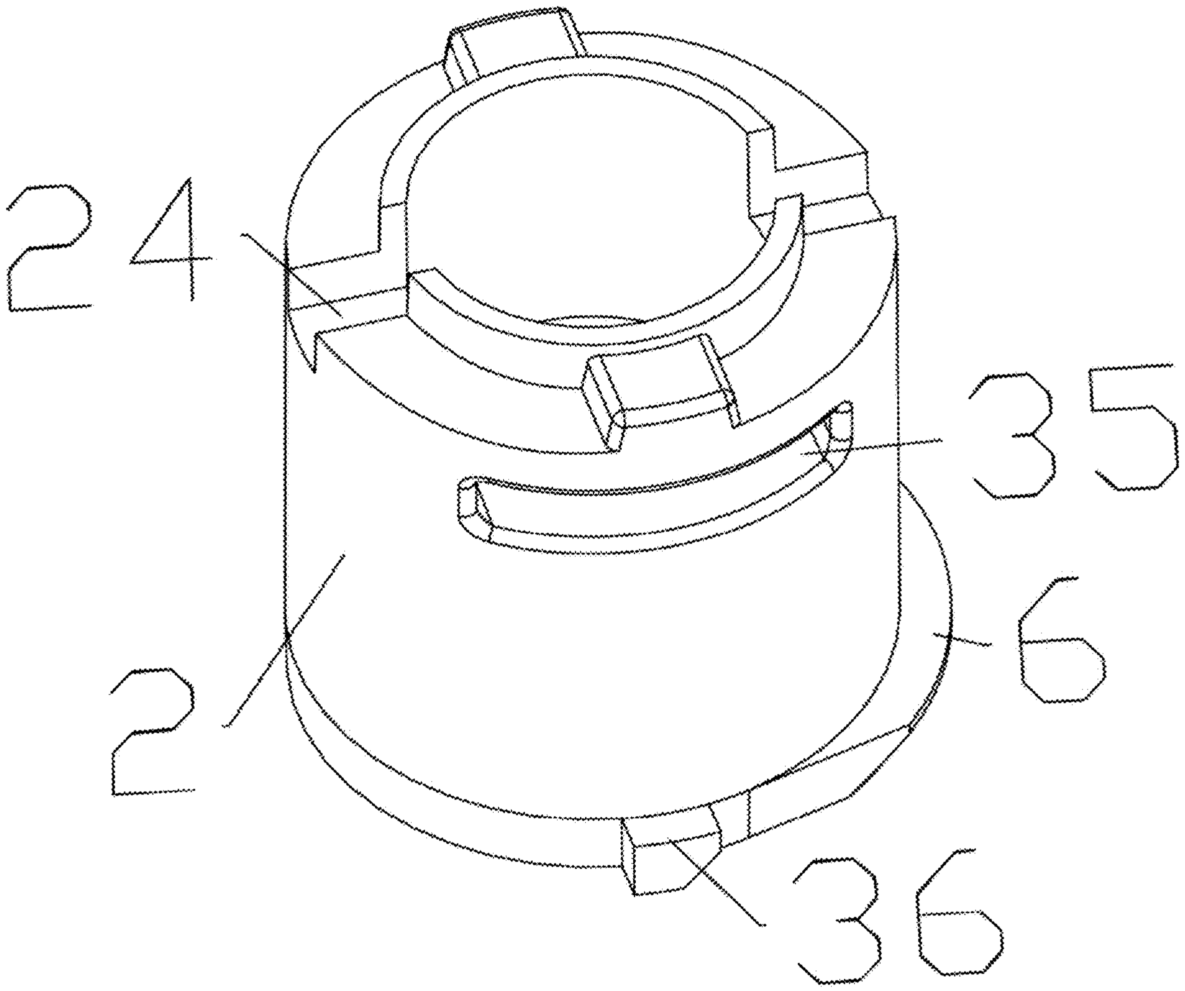
FIG. 10 is a top view of the stereoscopic structure of the upper connector of a multifunctional electric tool with the function of easy head replacement of the present invention, thereof.
Figure 11:
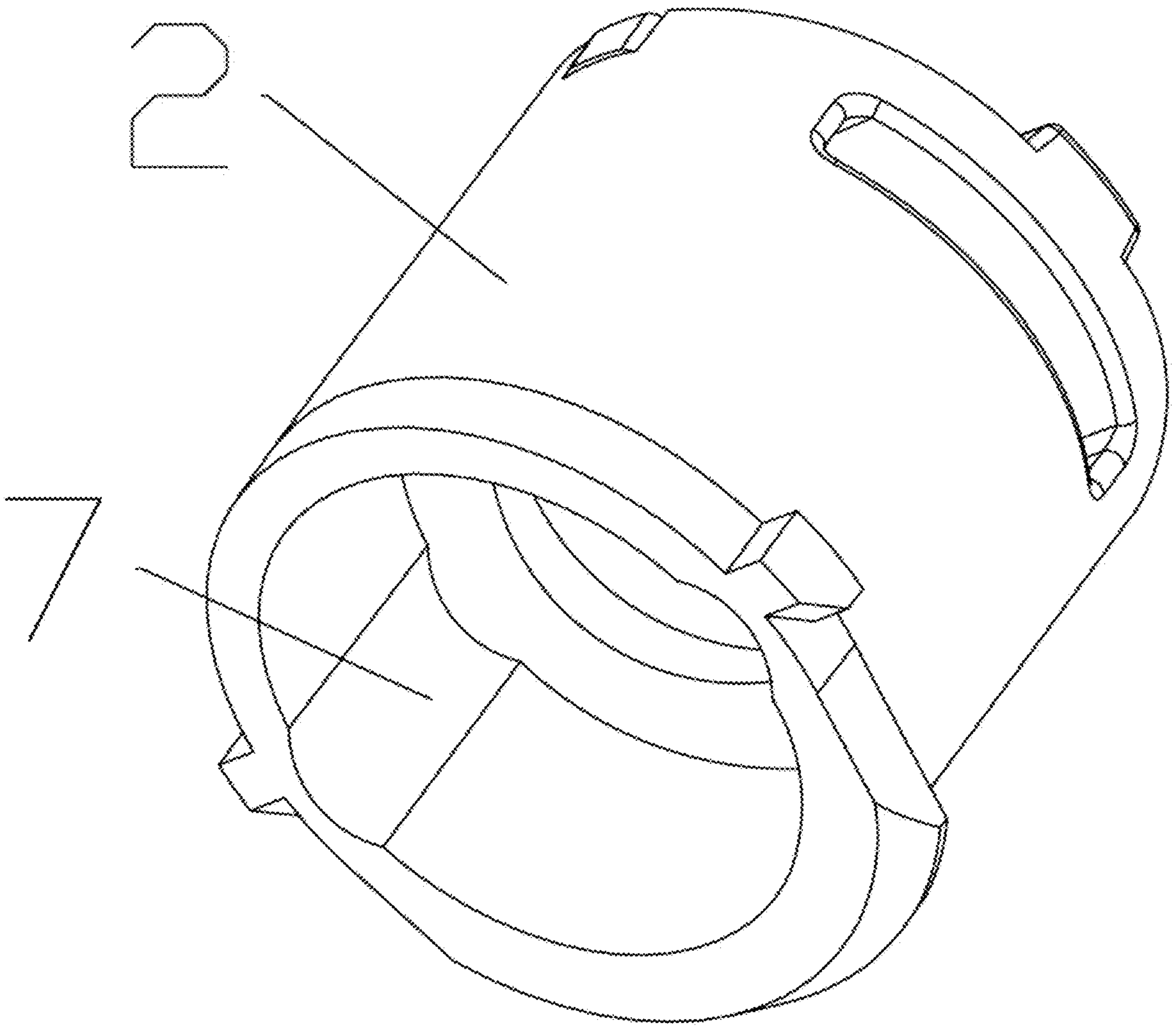
FIG. 11 is a bottom view of the stereoscopic structure of the upper connector of a multifunctional electric tool with the function of easy head replacement of the present invention, thereof.
Figure 12:
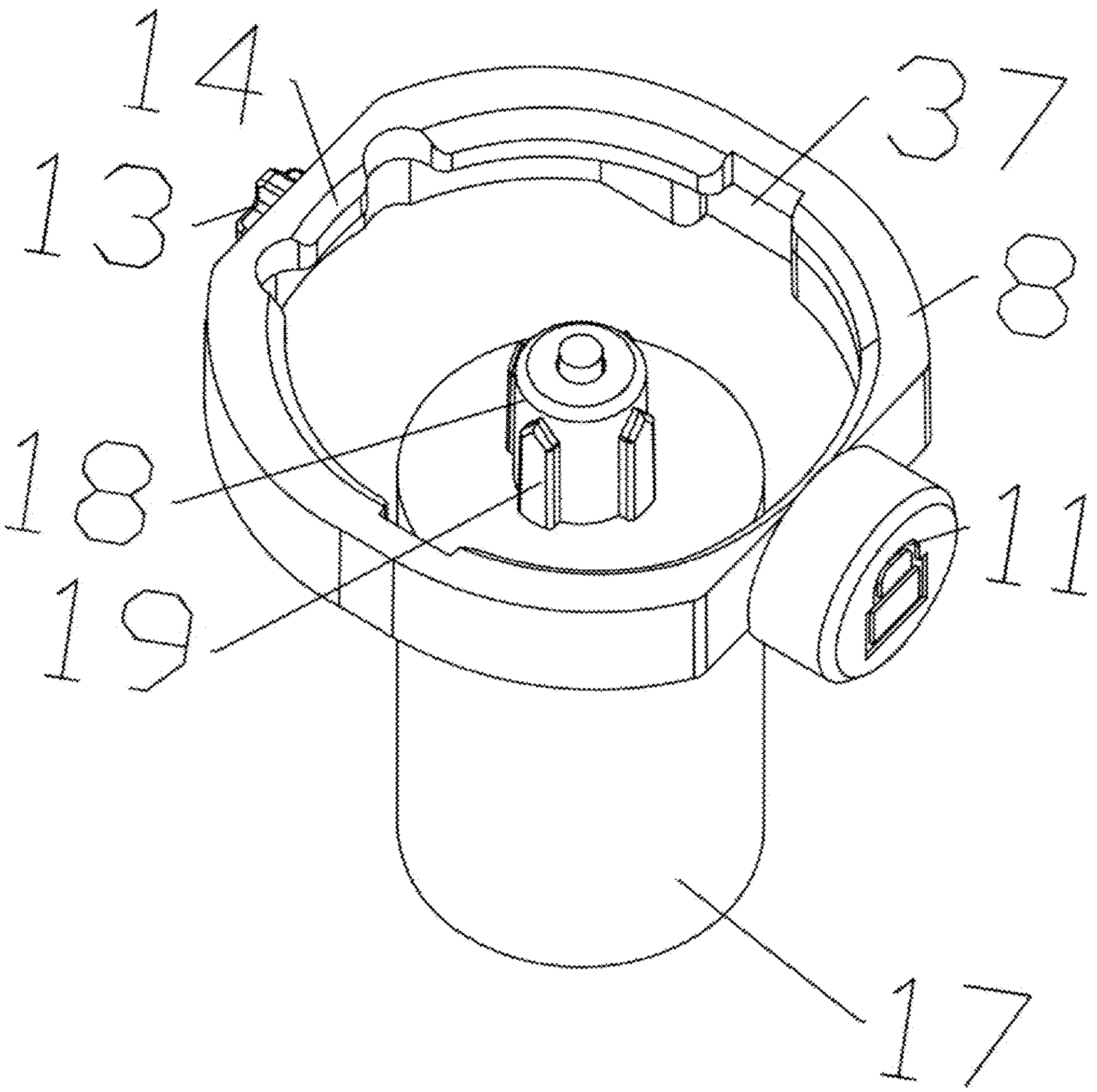
FIG. 12 is a structural schematic diagram of a limit adjustment ring of a multifunctional electric tool with the function of easy head replacement of the present invention, thereof.
Figure 13:
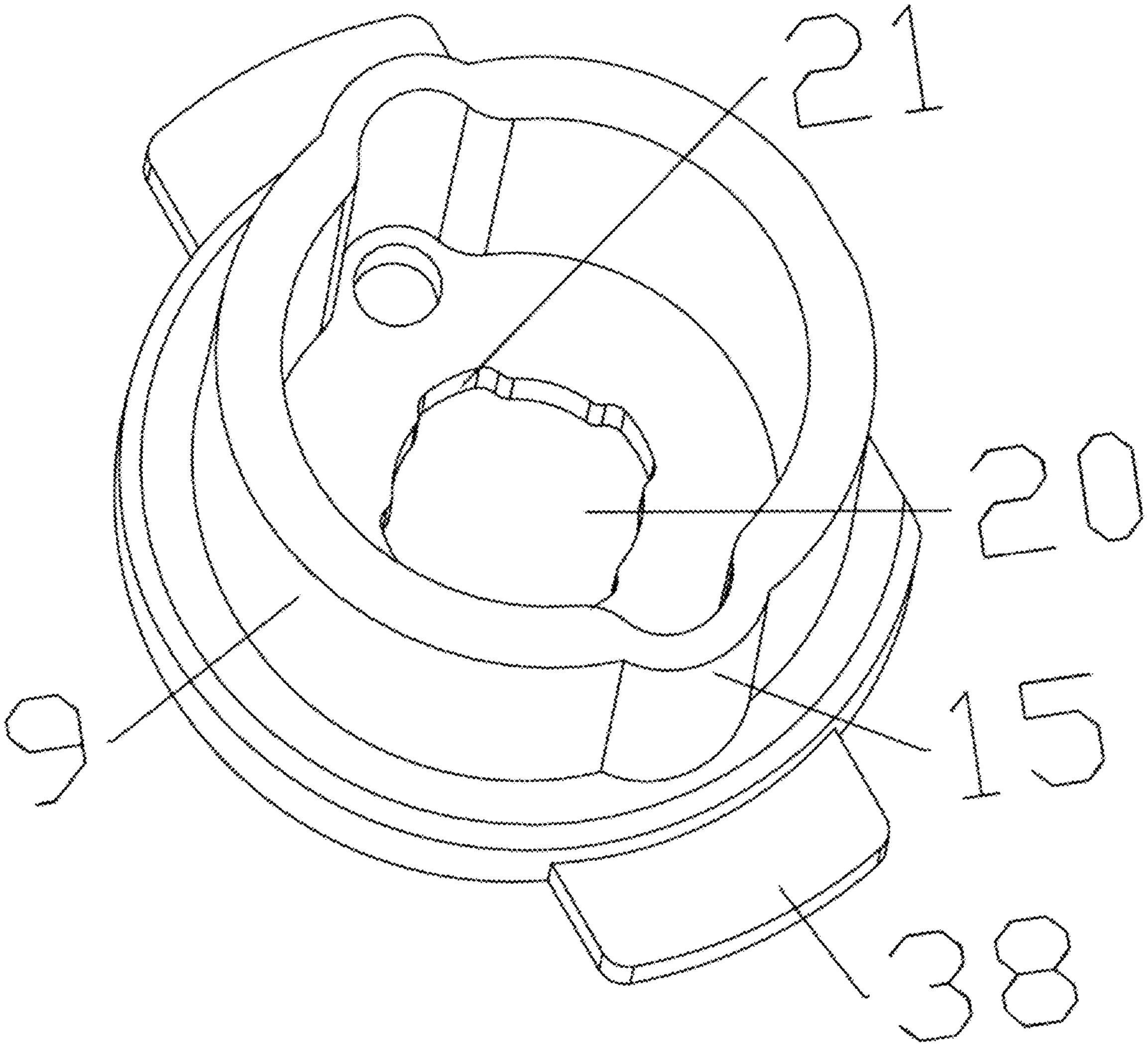
FIG. 13 is a schematic diagram of the structure of an external connection tube of a multifunctional electric tool with the function of easy head replacement of the present invention, thereof.

1. tool head,

2. upper connecting head,

3. shell, 4. guide plate,
5. guide groove,
6. limit plate,
7. connecting groove,
8. limit adjustment ring,
9. external connecting tube,
10. spring,
11. unlocking button,
12. first hole,
13. spring connecting part,
14. limiting part,
15. arc-shaped protrusion,
16. battery,
17. motor,
18. internal connecting tube,
19. limiting edge,
20. connecting hole,
21. limit groove,
22. connector,
23. positioning sleeve,
24. card slot,
25. card board,
26. control panel,
27. power switch,
28. adjustment button,
29. second hole,
30. notch,
31. charging socket,
32. light,
33. light switch,
34. third hole,
35. slot,
36. positioning block,
37. positioning groove,
38. connecting plug board,
39. installation groove While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As shown in FIG. 1-17, a multifunctional electric tool with the function of easy head replacement, comprising at least one tool head. Users can choose the appropriate tool head for replacement according to specific needs. Specifically, the tool head can include a screwdriver head, a shearing tool head, and a grinding tool head. The tool head is detachably mounted on the upper connection head to switch between different functions.

The multifunctional electric tool with the function of easy head replacement, also comprising a control mechanism, a power mechanism, an upper connecting head 2, a quick-connect and quick-disconnect mechanism and a shell 3. The tool head 1 is mounted on the upper connecting head 2 in a detachable manner, a limit plate 6 is provided on the outer wall of the lower end of the upper connecting head 2, and a connecting groove 7 is symmetrically provided on the inner wall of the lower end of the upper connecting head 2. The quick-connect and quick-release mechanism is arranged on the upper inner part of the shell 3, and the front and rear ends of the inner wall of the upper end of the shell 3 are provided with inclined guide plates 4, and the guide plates 4 at the front and rear ends of the shell 3 are symmetrical about the midpoint of the end of the shell 6. Guide grooves 5 are provided on both sides of the lower end of the tool head 4. The tool head 1 slides with the corresponding guide plates 4 through the guide grooves 5. When the tool head 1 is installed, on the one hand, it provides a guiding effect on the tool head 1, and the other hand, it can also make the tool head 1 move downward in a spiral manner, and the installation is more secure. The upper connecting head 2 is connected and cooperated with the connecting groove 7, the limit plate 6 and the quick-connect and quick-release mechanism to achieve quick release and quick connection. The Tool head 1 and shell 3 are provided with docking direction indication marks, which are convenient for distinguishing the installation direction when installing the tool head; the power mechanism is arranged in shell 3, and the control mechanism is arranged in shell 3.

The quick-connect and quick-release mechanism includes a limit adjustment ring 8, an external connection tube 9, and a spring 10. An unlocking button 11 is provided on the outer side of one end of the limit adjustment ring 8. A first hole 12 is provided on the outer shell 3 at a position corresponding to the unlocking button 11. The unlocking button 11 extends from the first hole 12. A spring connecting part 13 is provided on the outer side of the other end of the limit adjustment ring 8. The spring 10 is sleeved on the spring connecting part 13. The other end of the spring 10 is against the inner wall of the outer shell 3. A groove is provided on the inner wall of the outer shell 3. One end of the spring 10 is located in the groove. A limit part 14 is provided on the inner side of one end of the limit adjustment ring 8 provided with the spring connecting part 13. The limit part 14 cooperates with the limit plate 6 to limit and fix the upper connecting head 2. Pressing the unlocking button 11 will give the limit adjusting ring 8 a force to move in the direction of the spring 10, thereby driving the limit adjusting ring 8 to move so that the limit part 14 releases the limit on the limit plate 6, which is convenient for disassembling the tool head 1; when the unlocking button 11 is not pressed, the spring 10 will push the limit adjusting ring 8 to move to the other side of the shell 3. At this time, the limit part 14 will be located just above the limit plate 6, thereby limiting and fixing the limit plate 6, and the spring 10 will always push the limit adjusting ring 8 so that the limit part 14 will not slip, making the tool head 1 and the upper connecting head 2 installed more firmly.

The outer connecting tube 9 is symmetrically provided with arc-shaped protrusions 15, and the outer connecting tube 9 is arranged in the limit adjustment ring 8. The lower end of the upper connecting head 2 is sleeved on the outer connecting tube 9, and the arc-shaped protrusions 15 cooperate with the connecting groove 7 so that the outer connecting tube 9 and the upper connecting head 2 are connected.

The lower end of the outer connecting tube 9 is symmetrically provided with a connecting plug board 38, and the inner wall of the outer shell 3 is symmetrically provided with a installation groove 39. The outer connecting tube 9 is firmly installed in the outer shell 3 through the cooperation of the connecting plug board 38 and the installation groove 39.

The power mechanism includes a battery 16, a motor 17, and an internal connecting tube 18, wherein the battery 16 is arranged at the lower inner part of the outer shell 3, and the motor 17 is arranged in the outer shell 3 and is located above the battery 16. A plurality of limiting edge 19 are evenly arranged on the outer periphery of the lower end of the internal connecting tube 18, and a connecting hole 20 is provided at the lower end of the outer connecting tube 9, and a plurality of limiting grooves 21 are evenly arranged on the inner wall of the connecting hole 20. The internal connecting tube 18 is arranged in connecting hole 20, and the limiting edge 19 are connected and matched with the corresponding limiting grooves 21. The rotating shaft of motor 17 extends from the internal connecting tube 18 to the outer connecting tube 9, and the lower end of the outer connecting tube 9 abuts against motor 17, and the outer connecting tube 9 and motor 17 are fixed by bolts. Since the outer connecting tube 9 is installed in the outer shell 3 through the connecting plug board 38, the fixed installation of motor 17 in outer shell 3 can also be realized.

The internal connecting tube 18 is provided with a connector 22 which cooperates with the internal connecting tube 18. The upper end of the connector 22 extends into the tool head 1 to drive the tool head 1 to move.

The upper end of the upper connecting head 2 is provided with a positioning sleeve 23, and the upper end of the upper connecting head 2 is symmetrically supplied with a card slot 24. The positioning sleeve 23 is symmetrically provided with a card board 25. The card board 25 cooperates with the card slot 24 to position the positioning sleeve 23. The upper end of connector 22 passes through the positioning sleeve 23 and is rotatably connected to the positioning sleeve 23. In this way, positioning sleeve 23 can limit connector 22 to a certain extent, preventing connector 22 from shaking when motor 17 drives connector 22 to rotate.

The control mechanism includes a control panel 26, a power switch 27, and an adjustment button 28. The control panel 26 is arranged in the shell 3. The power switch 27 is welded on the control panel 26. The adjustment button 28 is welded on the control panel 26. A second hole 29 is provided at a position corresponding to the power switch 27 on shell 3. The power switch 27 extends from the second hole 29. A notch 30 is provided at a position corresponding to the adjustment button 28 on shell 3. The adjustment button 28 extends from the notch 30.

The control panel 26 is provided with a charging socket 31 at the lower end, and the charging socket 31 extends from the lower end of the shell 3. The shell 3 is provided with a lamp 32 at the lower end. The control panel 26 is provided with a lamp switch 33. The shell 3 is provided with a third hole 34 at a position corresponding to the lamp switch 33. The lamp switch 33 extends from the third hole 34.

The upper end of the upper connecting head 2 is symmetrically provided with a slot 35, and the tool head 1 can be connected to the upper connecting head 2 through slot 35 and fixed by bolts. Each tool head 1 is installed with an upper connecting head 2 so that when the tool head is replaced, it can be quickly replaced.

The lower end of the upper connecting head 2 is symmetrically provided with a positioning block 36, and the inner wall of the limit adjustment ring 8 is symmetrically provided with a positioning groove 37. The positioning block 36 and the positioning groove 37 cooperate.

When in use, as shown in FIGS. 1-4, the bolt bit tool head 1 is installed. Long press the power switch 27 to turn on the power. Press the upper end of the adjustment button 28 to rotate the bolt bit tool head 1 forward. Press the lower end of the adjustment button 28 to reverse the bolt bit tool head 1. The forward and reverse rotation of the bolt bit tool head 1 can be adjusted. Release the adjustment button 28 and the bolt bit tool head 1 stops rotating.

Figure 14:
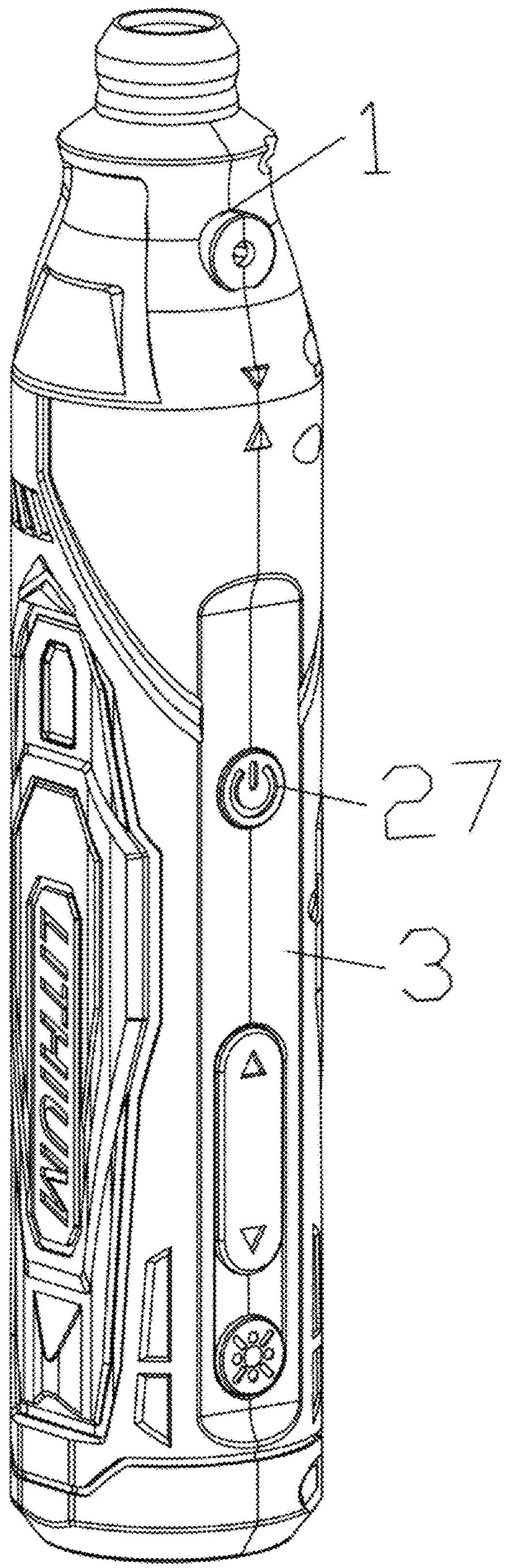
FIG. 14 is a schematic diagram of the structure of a second embodiment of a multifunctional electric tool with the function of easy head replacement of the present invention, thereof.
Figure 15:
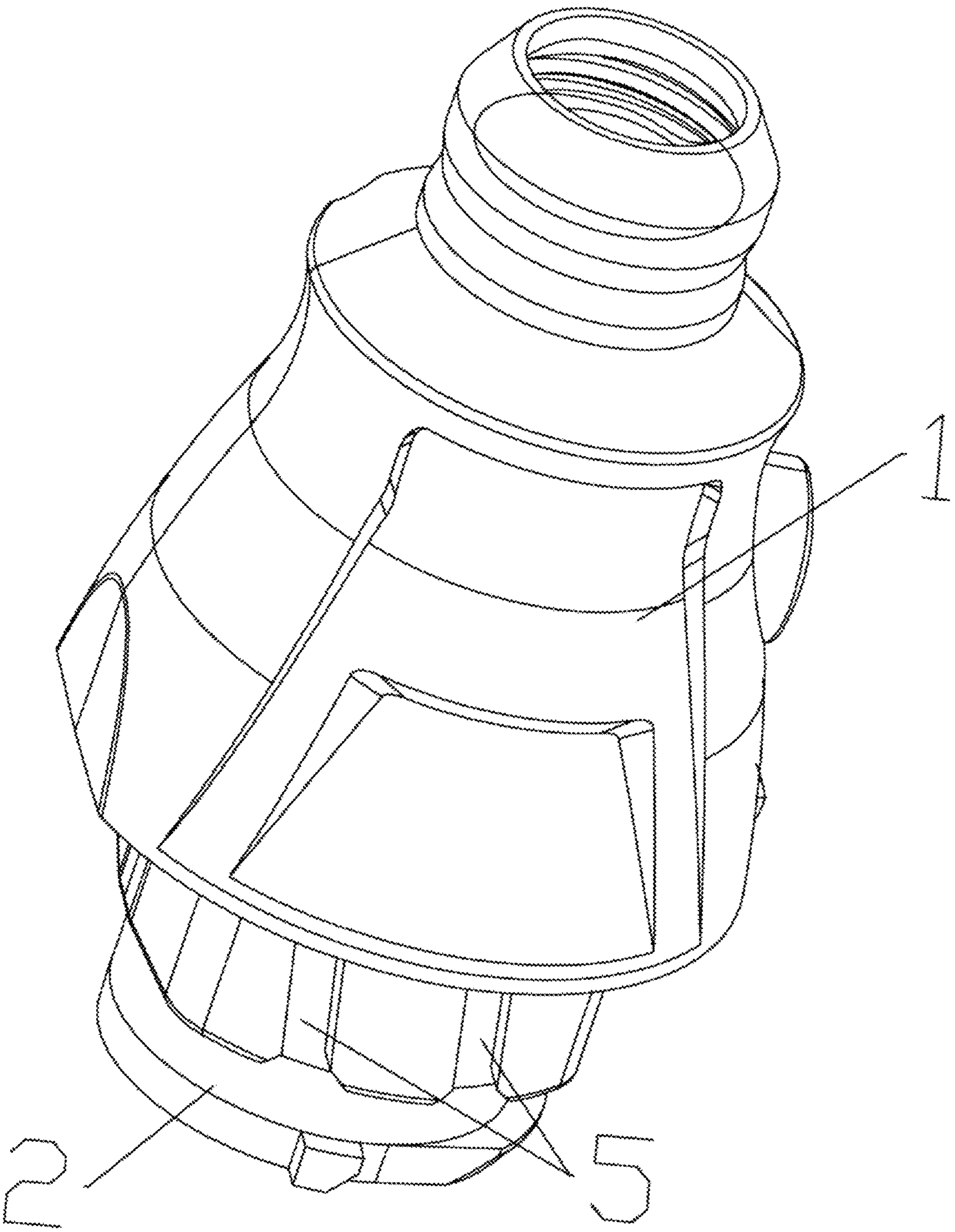
FIG. 15 is a schematic diagram of the structure of a tool head of a second embodiment of a multifunctional electric tool with the function of easy head replacement of the present invention, thereof.

As shown in FIGS. 14-15, the grinding tool head 1 is installed. Press and hold the power switch 27 to turn on the power, and the grinding tool head 1 starts to rotate. At this time, the upper and lower ends of the adjustment button 28 can be used to increase or decrease the speed of the grinding tool head 1 to achieve speed regulation.

Figure 16:
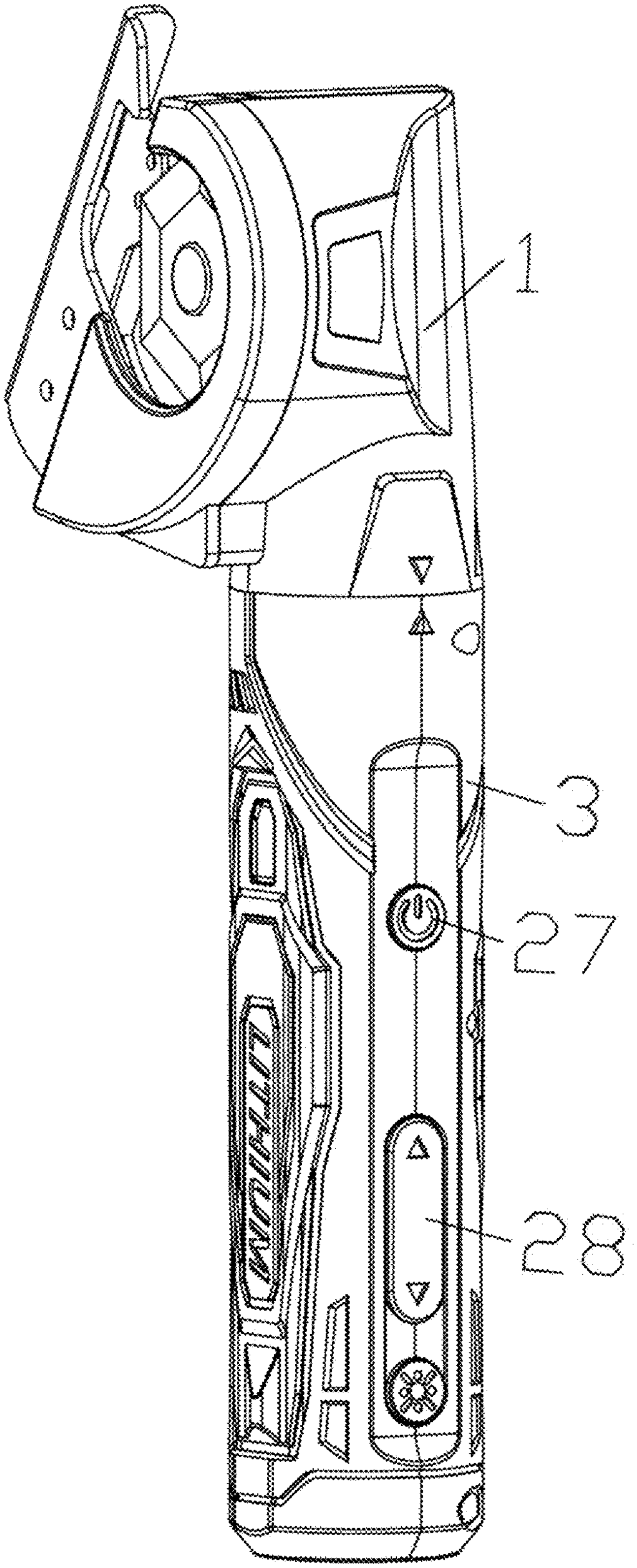
FIG. 16 is a schematic diagram of the structure of a third embodiment of a multifunctional electric tool with the function of easy head replacement of the present invention, thereof.
Figure 17:
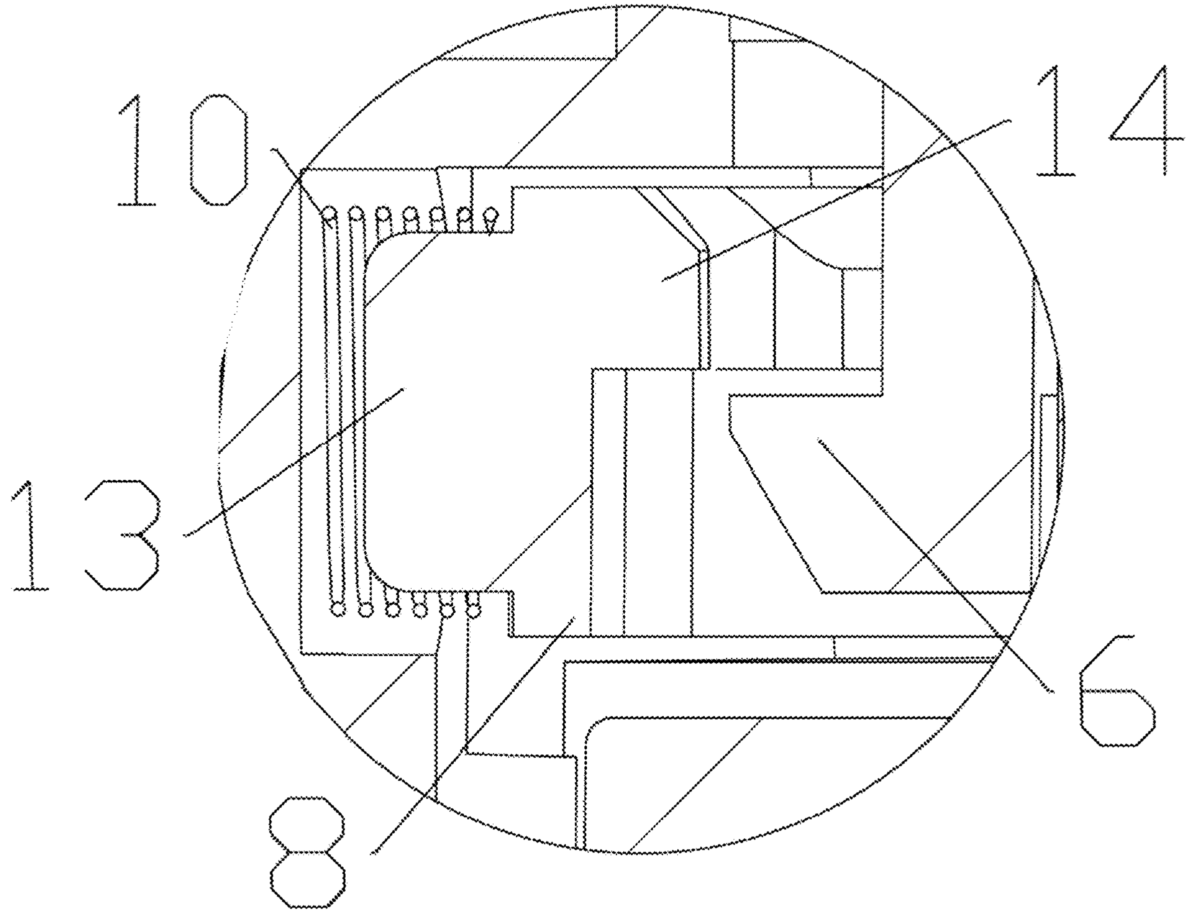
FIG. 17 is a partial enlarged view of B in FIG. 4, thereof.

As shown in FIG. 16, the installation state of the shearing tool head 1. The power switch 27 is pressed for 1.5 seconds to turn on the power and start the shearing tool head 1. After the power switch 27 is released, the shearing tool head 1 stops working to prevent accidental touch.

As shown in FIG. 15, each tool head 1 is installed with an upper connecting head 2 so that the tool head can be quickly replaced; when assembling the tool head 1 and the upper connecting head 2, the tool head 1 is first split into two halves, and then one half is buckled on the upper connecting head 2, and the limiting structure on the tool head 1 is inserted into the slot 35 on the upper connecting head 2 to make the connection between the two tighter, and then the other half of the tool head is also installed on the upper connecting head 2, and then the two halves of the tool head 1 are connected and fixed by bolts so that the tool head 1 and the upper connecting head 2 are stably connected.

Then install the tool head to the upper end of the shell 3, hold the tool head 1, and insert the upper connecting head 2 into the shell 3. Since there are docking direction indication marks on both the tool head 1 and the shell 3, when plugging, the two docking direction indication marks need to be on the same side to prevent the plugging direction from being wrong.

During plugging, the guide groove 5 of the tool head 1 and the corresponding guide plate 4 slide together, and then the tool head 1 is pressed down, and the tool head 1 will be spirally inserted downward along the guide plate 4 into the shell 3 so that the connection is tighter. As the tool head 1 and the upper connecting head 2 move downward, the limit plate 6 on the outer wall of the lower end of the upper connecting head 2 will press down the limit part 14, and the limit adjustment ring 8 will move to the side of the spring 10. When the limit plate 6 and the limit part 14 are misaligned, under the action of the spring 10, the limit adjustment ring 8 will be reset, and the limit part 14 will be located above the limit plate 6, thereby limiting and fixing the upper connecting head 2. In this way, the upper connecting head 2 and the tool head 1 are installed, and the upper end of the connector 22 will be inserted into the tool head 1, driving the tool head 1 to run, thereby realizing the quick installation of the tool head.

When the upper connecting head 2 moves downward, the connection groove 7 on the inner wall of the upper connecting head 2 cooperates with the arc-shaped protrusion 15, and the arc-shaped protrusion 15 guides the upper connecting head 2 and also connects the upper connecting head 2 and the outer connecting tube 9 together; the positioning block 36 enters the corresponding positioning groove 37.

When disassembling, press the unlocking button 11, which will push the limit adjustment ring 8 to move toward the side of the spring 10 and compress the spring 10. At this time, the positioning groove 37 gives the limit adjustment ring 8 a range of movement. When the positioning groove 37 is against the positioning block 36 on the upper connecting head 2, the movement of the limit adjustment ring 8 reaches the limit. At this time, the limit part 14 and the limit plate 6 will be misaligned, and the limit part 14 will not be located directly above the limit plate 6. The limit part 14 will release the limit on the limit plate 6, so that the tool head 1 and the upper connecting head 2 can be directly pulled out upwards, thus realizing the quick disassembly of the tool head 1. Release the unlocking button 11, and the limit adjustment ring 8 will rebound and reset under the action of the spring 10.

The invention claimed is:

1. A multifunctional electric tool with the function of easy head replacement, comprising at least one tool head, a control mechanism, a power mechanism, an upper connecting head, a quick-connect and quick-disconnect mechanism, and a shell; wherein the tool head is mounted on the upper connecting head in a detachable manner, a limit plate is provided on the outer wall of the lower end of the upper connecting head, and a connecting groove is symmetrically provided on the inner wall of the lower end of the upper connecting head; wherein the quick-connect and quick-release mechanism is arranged on the upper inner part of the shell, and the front and rear ends of the inner wall of the upper end of the shell are provided with inclined guide plates, and the guide plates at the front and rear ends of the shell are symmetrical about the midpoint of the shell end; wherein the guide grooves are provided on both sides of the lower end of the tool head, and the tool head slides with the corresponding guide plates through the guide grooves, and the upper connecting head is connected and matched with the connecting groove, the limit plate and the quick-connect and quick-release mechanism to achieve quick release and quick connection; wherein the power mechanism is arranged in the shell, and the control mechanism is arranged in the shell;

wherein the quick-connect and quick-release mechanism includes a limit adjustment ring, an external connecting tube and a spring, an unlocking button is provided on the outer side of one end of the limit adjustment ring, a first hole is provided on the outer shell at a position corresponding to the unlocking button, the unlocking button extends from the first hole, a spring connecting part is provided on the outer side of the other end of the limit adjustment ring, the spring is sleeved on the spring connecting part, and the other end of the spring is against the inner wall of the outer shell, a limit part is provided on the inner side of one end of the limit adjustment ring provided with the spring connecting part, the limit part cooperates with the limit plate to limit and fix the upper connecting head, arc-shaped protrusions are symmetrically provided on the external connecting tube, the external connecting tube is arranged in the limit adjustment ring, the lower end of the upper connecting head is sleeved on the external connecting tube, and the arc-shaped protrusion cooperates with the connecting groove;

wherein the lower end of the outer connecting tube is symmetrically provided with a connecting plug board, and the inner wall of the outer shell is symmetrically provided with a installation groove; and the outer connecting tube is installed in the outer shell through the cooperation of the connecting plug board and the installation groove.

2. The multifunctional electric tool with the function of easy head replacement of claim 1, wherein the power mechanism comprising a battery, a motor and an internal connecting tube, wherein the battery is arranged at the lower inner part of the outer shell, the motor is arranged in the outer shell and is located above the battery, a plurality of limiting edges are evenly arranged on the outer periphery of the lower end of the internal connecting tube, a connecting hole is arranged at the lower end of the outer connecting tube, a plurality of limiting grooves are evenly arranged on the inner wall of the connecting hole, the internal connecting tube is arranged in the connecting hole, and the limiting edges are connected and matched with the corresponding limiting grooves, the rotating shaft of the motor extends from the internal connecting tube to the inner part of the outer connecting tube, and the lower end of the outer connecting tube abuts against the motor.

3. The multifunctional electric tool with the function of easy head replacement of claim 2, wherein the internal connecting tube is provided with a matching connector, the upper end of which extends into the tool head to drive the tool head to move.

4. The multifunctional electric tool with the function of easy head replacement of claim 3, wherein the upper end of the upper connecting head is provided with a positioning sleeve, the upper end of the upper connecting head is symmetrically supplied with a card slot, the positioning sleeve is symmetrically supplied with a card board, the card board and the card slot cooperate to position the positioning sleeve, the upper end of the connector passes through the positioning sleeve and is rotatably connected with the positioning sleeve.

5. The multifunctional electric tool with the function of easy head replacement of claim 1, wherein the control mechanism includes a control panel, a power switch, and an adjustment button; wherein the control panel is arranged in the shell; the power switch is welded on the control panel; the adjustment button is welded on the control panel; wherein a second hole is placed on the shell at a position corresponding to the power switch; the power switch extends from the second hole; wherein a notch is arranged on the shell at a position corresponding to the adjustment button; wherein the adjustment button extends from the notch.

6. The multifunctional electric tool with the function of easy head replacement of claim 5, wherein the control panel is provided with a charging socket at the lower end, the charging socket extends from the lower end of the shell, the lower end of the shell is provided with a lamp, the control panel is provided with a lamp switch, the shell is provided with a third hole at a position corresponding to the lamp switch, the lamp switch extends from the third hole.

7. The multifunctional electric tool with the function of easy head replacement of claim 1, wherein the upper end of the upper connecting head is symmetrically provided with slots, and the tool head can be connected to the upper connecting head through the slots and fixed by bolts.

8. The multifunctional electric tool with the function of easy head replacement of claim 1, wherein the lower end of the upper connecting head is symmetrically provided with a positioning block, and the inner wall of the limit adjustment ring is symmetrically provided with a positioning groove; wherein the positioning block and the positioning groove cooperate.

* * * * *